US00RE35972E

United States Patent [19]

Cuculo et al.

[11] E Patent Number: Re. 35,972

[45] Reissued Date of Patent: Nov. 24, 1998

[54] ULTRA-ORIENTED CRYSTALLINE FILAMENTS

[75] Inventors: John A. Cuculo; Paul A. Tucker, both of Raleigh; Gao-Yuan Chen, Apex; Ferdinand Lundberg, Raleigh, all of N.C.

[73] Assignee: North Carolina State University, Raleigh, N.C.

[21] Appl. No.: 622,431

[22] Filed: Mar. 25, 1996

Related U.S. Patent Documents

Reissue of:

[64] Patent No.: 5,405,696
Issued: Apr. 11, 1995
Appl. No.: 161,320
Filed: Dec. 2, 1993

U.S. Applications:

[63] Continuation-in-part of Ser. No. 830,704, Feb. 4, 1992, Pat. No. 5,268,133, which is a continuation-in-part of Ser. No. 525,874, May 18, 1990, Pat. No. 5,149,480.

[51] Int. Cl.[6] ..... D02G 3/00; D02G 3/02

[52] U.S. Cl. ..... 428/364; 428/395; 428/902; 428/243

[58] Field of Search ..... 428/364, 395; 57/902, 243

[56] References Cited

U.S. PATENT DOCUMENTS

| | | | |
|---|---|---|---|
| 3,002,804 | 10/1961 | Kilian . | |
| 3,733,801 | 5/1973 | Jones | 57/156 |
| 4,134,882 | 1/1979 | Frankfort et al. . | |
| 4,425,293 | 1/1984 | Vassilatos . | |
| 4,446,299 | 5/1984 | Koschinek et al. . | |
| 4,835,053 | 5/1989 | Stanko . | |
| 4,909,976 | 3/1990 | Cuculo et al. . | |
| 4,975,326 | 12/1990 | Buyalos et al. . | |
| 5,019,316 | 5/1991 | Ueda et al. . | |
| 5,033,523 | 7/1991 | Buyalos et al. . | |
| 5,049,447 | 9/1991 | Shindo et al. . | |
| 5,137,670 | 8/1992 | Murase et al. . | |
| 5,149,480 | 9/1992 | Cuculo et al. . | |
| 5,171,504 | 12/1992 | Cuculo et al. . | |
| 5,182,068 | 1/1993 | Richardson . | |
| 5,186,879 | 2/1993 | Simons et al. . | |
| 5,234,764 | 8/1993 | Nelson et al. . | |
| 5,268,133 | 12/1993 | Cuculo et al. . | |
| 5,486,416 | 1/1996 | Johnson et al. | 428/357 |

FOREIGN PATENT DOCUMENTS 670932 9/1963 Canada .

OTHER PUBLICATIONS

Hawley's Condensed Chemical Dictionary p. 934 date 1930.

T. Kawaguchi, *Industrial Aspects of High–Speed Spinning*, Chapter 3, "Industrial View on High–Speed Spinning", p. 8–15 (1985).

*Primary Examiner*—Newton Edwards

*Attorney, Agent, or Firm*—Bell Seltzer Intellectual Property Law Group of Alston & Bird LLP

[57] ABSTRACT

Ultra-oriented, crystalline synthetic filaments with high tenacity are produced by extrusion of a fiber-forming synthetic polymer melt into a liquid isothermal bath maintained at a temperature of at least 30° C. above the glass transition temperature of the polymer, withdrawing the filaments from the bath and then winding up the filaments. Polymer filaments so produced are characterized in that the ratio of the crystalline orientation factor ($f_c$) to the amorphous orientation factor ($f_a$) is 1.2 or less, and are further characterized in that the percent crystallinity is less than 40. The filaments also have a fine crystal size. The crystal size is less than 40 Å in the 100 and $\bar{1}05$ planes and less than 30 Å in the 010 plane.

25 Claims, 4 Drawing Sheets

ULTRA-ORIENTED CRYSTALLINE FILAMENTS

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of application Ser. No. 07/830,704 filed Feb. 4, 1992, now U.S. Pat. No. 5,268,133 granted Dec. 7, 1993, which is a continuation-in-part of application Ser. No. 07/525,874, filed May 18, 1990, now U.S. Pat. No. 5,149,480 granted Sep. 22, 1992.

BACKGROUND OF THE INVENTION

This invention relates to a melt spinning process for production of fully oriented crystalline synthetic filaments with high mechanical properties, and to the thus produced filaments. More specifically, the present invention provides for melt spinning fiber-forming synthetic polymers to produce filaments with a very high degree of orientation, high crystallinity, low shrinkage, and high tenacity.

The typical melt spinning processes used commercially in the production of filaments or fibers from fiber-forming synthetic polymers may be characterized as two-step processes. The molten polymer is extruded through spinneret holes to form filaments, and then in a separate step, performed either in-line coupled with the extrusion step or in a separate subsequent operation, the filaments are stretched or drawn to increase the orientation and impart the desired physical properties. For example, commercial polyester filaments, such as polyethylene terephthalate (PET), have for many years been produced by a two step process in which the polymer melt is extruded through a spinneret to form filaments and after solidification, the filaments are wound up at speeds on the order of 1000 to 1500 m/min. The as-spun fibers are then subjected to drawing and annealing at speeds on the order of 400 to 1000 m/min. The handling, energy and capital equipment requirements for such two-step processes contribute significantly to the overall production cost.

In order to reduce production cost and increase production rate, it would be desirable to develop a process for producing fully oriented crystalline PET fibers in a single step with properties equivalent to or better than those produced by the conventional two-step processes. To this end, a number of researchers have explored technology based on high speed spinning. In 1979, DuPont [R. E. Frankfort and B. H. Knox, U.S. Pat. No. 4,134,882] documented a process based on high speed spinning technology at speeds up to about 7000 m/min, providing oriented crystalline PET filaments in one step having good thermal stability and good dyeing properties. However, the fibers have mechanical properties still inferior to those of fully drawn yarns produced by the conventional two-step process.

Parallel to the above study, reports on high speed spinning research can be found elsewhere in the literature since the late 1970's. Properties and structure of high speed spun PET fibers are well characterized. Typical characteristics of high speed spun fibers are lower tenacity, lower Young's modulus and greater elongation as compared with conventional fully oriented yarns [T. Kawaguchi, in "High Speed Fiber Spinning", A. Ziabicki and H. Kawai, Eds John Wiley & Sons, New York, 1985, p. 8]. More recently, a take-up speed up to 12,000 m/min for spinning PET has been reported. But, heretofore it has not been possible to produce as-spun PET fibers by superhigh speed spinning that have properties equivalent to those of conventional two-step spun Fibers. Moreover, the orientation and crystallinity of as-spun fibers, respectively, reach maximum values at certain critical speeds, above which severe structural defects such as high radial non-uniformity and microvoids start to develop, which materially restrict attainment of high performance fibers.

Our objective in the present invention is similar to that of the above-noted researchers: namely, providing a process for producing fully oriented crystalline fibers in a single step with properties equivalent to or better than those produced by the conventional two-step processes. However, in pursuing this objective, we have departed from the path followed by the above-noted researchers. This invention modifies the threadline dynamics of the spinning operation to produce high performance fibers in a one-step process.

It was revealed in our previous work [Cuculo, et al. U.S. Pat. No. 4,909,976, granted Mar. 20, 1990] that fiber structure (orientation and crystallization) development along the fiber spinning threadline can be significantly enhanced by optimizing the threadline temperature profile. This was achieved by introducing a zone cooling and zone heating technique to alter the temperature profile of the spinning threadline to enhance the structure formation. Take-up stress remained almost unchanged as compared with that of conventional spinning.

SUMMARY OF THE INVENTION

Unlike our previous work, the process of the present invention alters both the stress and the temperature profiles of the spinning threadline, simultaneously. Stress is provided in the threadline in the area where the structure of the filaments is developing to achieve a high level of orientation in the filaments. Also, the threadline in this zone is maintained at a temperature selected for optimum crystallization and radial uniformity.

The present invention provides ultra-oriented, high tenacity fibers from fiber-forming thermoplastic polymers such as polyethylene terephthalate (PET) and nylon. Specifically, molten fiber-forming thermoplastic polymer is extruded in the form of filaments, and the filaments are directed into a liquid bath which is maintained at a temperature at least 30° C. above the glass transition temperature of the thermoplastic polymer to provide isothermal crystallization conditions for the filaments in the bath. The filaments are withdrawn from the bath and then wound up at speeds on the order of 3000–7000 m/min. The filaments thus produced possess high birefringence indicative of a high level of molecular orientation. The filaments are also characterized by having a high level of radial uniformity, and in particular, high radial uniformity of birefringence. The filaments so produced also have a unique relationship between the crystalline orientation factor and the amorphous orientation factor. Filaments according to the invention are characterized in that the ratio of the crystalline orientation factor ($f_c$) to the amorphous orientation factor ($f_a$) is 1.2 or less, while $f_c$ is 0.9 or above. They are further characterized in that the weight percent crystallinity is less than 40 and preferably less than 25. The fibers of the present invention also possess a fine crystal size. Typically, the crystal size is less than 40 Å in the 100 and $\bar{1}05$ planes and less than 30 Å in the 010 plane.

Liquid quench baths have been used in other prior art processes in connection with melt spinning operations, but the function of the liquid quench bath in the present invention and the results achieved in accordance with this invention differ significantly from the prior art processes. For example, in Vassilatos U.S. Pat. No. 4,425,293 (1984), a liquid quench bath is employed using room temperature water to achieve rapid quenching for suppression of polymer crystallization. In contrast, the liquid bath in the present invention is maintained at conditions designed to avoid rapid quench so that an isothermal condition is assured for maximizing crystallization in the threadline.

Koschinek, et al. U.S. Pat. No. 4,446,299 (1984) discloses a process in which filaments are first cooled to a temperature below the adhesive limit (normally equivalent to $T_g$) and are then collected into a bundle and passed into a so called "frictional tension-increasing device", which uses either blown or quiescent air. The filaments may then be treated with a separate high temperature conditioning zone. The present invention does not require the cooling of the molten filaments below the adhesive limit before entering the bath; instead, the filament is immersed in a liquid medium at high temperature while it is still in the molten state (or at least 30 degrees above $T_g$). An additional conditioning zone is not used in the present invention. Besides, the spinning stress achieved in the Koschinek, et al. process is only a few percent of that obtained in the present invention; and more importantly, the excellent physical properties obtained in accordance with the present invention are not achieved by this prior art process.

J. J. Kilian, in U.S. Pat. No. 3,002,804, employed a water bath maintained at a temperature of 80°–90° C. for the purpose of drawing freshly spun filaments into uniform oriented filaments. The filaments may become oriented due to the cold drawing effect; but the crystallization of the filaments is suppressed by the liquid in the temperature range given. An oriented filament without crystallinity ordinarily has poor thermal stability such as high boil-off shrinkage and still needs post-treatment before it can become useful. Although Kilian obtained a maximum tenacity of 7.7 g/d at an extremely long depth (ten feet) of water at 88° C., the mechanical properties of most of his product are inferior to those of conventional fully-drawn yarns. On the other hand, the present invention provides crystalline PET filaments with a birefringence approaching the intrinsic value of PET crystals. The filaments are thermally stable with low level of boil-off shrinkage and can be directly used in textile applications where high tenacity fibers are required without requiring post-treatment.

DESCRIPTION OF THE DRAWINGS

Some of the features and advantages of the invention having been stated, further features and advantages will become apparent from the detailed description which follows and from the accompanying drawings, in which.

DETAILED DESCRIPTION OF THE INVENTION

The present invention involves a process that is different from traditional melt spinning. Traditional melt spinning involves the extrusion of a polymer melt through spinneret holes, cooling of the extrudate with quench air to room temperature and winding up of the solidified filament for post-treatment to achieve desired mechanical properties. This invention employs a liquid isothermal bath in the spinning line at a location below the spinneret face.

The extrudate is directed into the liquid isothermal bath while it is still in a molten state or at least 30° C. above the glass transition temperature of the polymer. The bath temperature should be maintained at a temperature at least 30° C. above the polymer glass transition temperature ($T_g$) to assure sufficient mobility of molecules for crystallization to proceed. Filaments in the bath undergo rapid orientation under isothermal conditions. The liquid medium in the bath not only provides an isothermal crystallization condition, which contributes to the radial uniformity of the filament structure, but also adds frictional drag, thus exerting a take-up stress on the running filaments which contributes to high molecular orientation. The level of take-up stress on the threadline depends on several factors such as liquid temperature, viscosity, depth and relative velocity between filaments and liquid medium. Preferably, in accordance with the present invention the take-up stress is maintained within the range of 0.6 to 6 g/d (grams per denier), and most desirably within the range of 1–5 g/d.

Table I presents a set of data showing the take-up stress at different speeds and liquid depths. The level of take-up stress of the spinning with the liquid bath is substantially greater than that of spinning with air medium only (zero liquid depth). The take-up stress (ratio of tensile force to filament cross sectional area or linear density) at 3000 m/min reaches 3.2 g/d (or 2.88 g/dtex) at a liquid bath length of 40 cm, compared with a value of 0.22 g/d (or 0.198 g/dtex) for spinning without the liquid bath i.e., with air only as frictional medium. This implies that the take-up stress in the liquid bath spinning line is generated mainly by liquid drag. Because of its high frictional effect as well as its high density, high heat capacity and high heat conductivity coefficient compared with air medium, a liquid medium is often employed as an efficient means for rapid quenching or heating or exerting high frictional force on a running filament in melt spinning or in a drawing process.

TABLE 1

Take-up Stress of PET Spinning*

| Depth of Liquid cm | Speed (m/min) 2000 g/d | 2500 g/d | 3000 g/d |
|---|---|---|---|
| 0 | 0.1 | 0.16 | 0.22 |
| 10 | 0.84 | 1.0 | 1.26 |
| 17 | 1.2 | 1.44 | 1.9 |
| 24 | 1.44 | 1.8 | 2.3 |
| 32 | 1.74 | 2.2 | 2.8 |
| 40 | 2.0 | 2.44 | 3.2 |

*0.95 IV PET, Liquid at 120° C., 5.0 denier.

Figure 1:
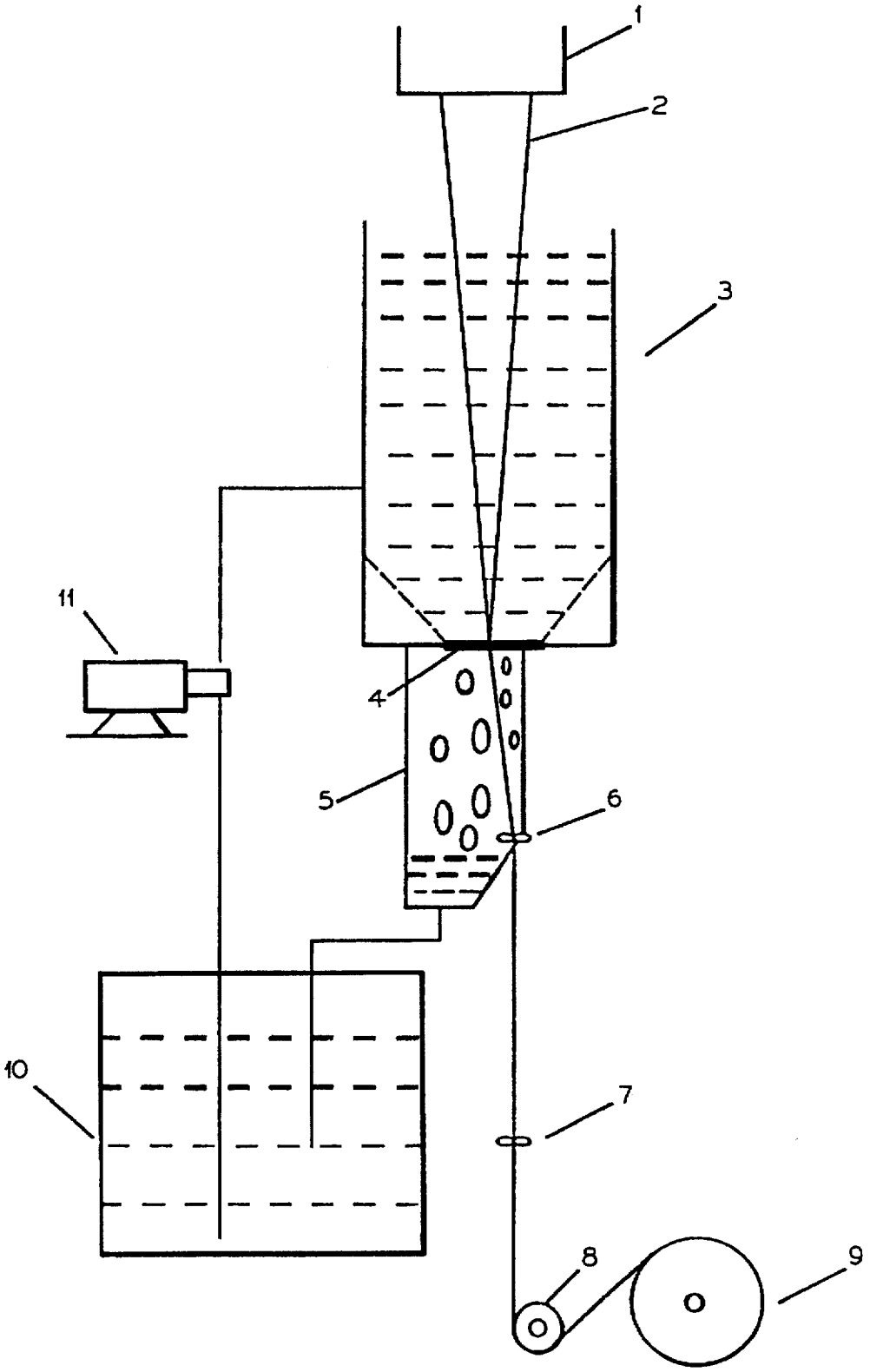
FIG. 1 is a schematic representation of an apparatus capable of practicing the process and producing the product of the present invention.

One typical arrangement of the experimental set-up of this invention is illustrated in FIG. 1. Thermoplastic polymers such as PET are melted and extruded through spinneret 1 with a single or multiple holes. After the extrudate 2 passes through an air gap while still in the molten state or at a temperature at least 30° C. above $T_g$, it is then directed into a liquid isothermal bath 3. The liquid bath should be kept at a temperature at least 30° C. above the glass transition temperature ($T_g$) of the polymer. For PET the preferable range is 120°–180° C. The crystallized solid filament is then pulled out through an aperture with a sliding valve 4 in the bottom of the liquid isothermal bath, passes through a closed liquid-catching device 5, through guides 6,7, around a godet 8, and is ultimately wound up with a take-up device 9 at a winding speed of at least 3000 m/min. The sliding valve 4 is designed so that it can be opened for fast drainage of liquid from the liquid isothermal bath 3 to a reservoir 10 and for ease of free passage of the filaments through the bath before being fed onto the winder 9. After the filaments are threaded and taken up by the winder 9, the valve 4 is then closed leaving an orifice at the center just large enough to allow the filament bundle to pass through freely. The liquid isothermal bath 3 is then filled with a selected liquid, which is preheated in the reservoir 10. The liquid is maintained in the liquid isothermal bath 3 at a desired constant level and a constant temperature. The liquid-catching device 5, attached directly below the liquid isothermal bath, can be readily moved back and forth allowing ease of filament threading and can be closed to catch the small stream and the flying drops of the hot liquid carried along by the filament bundle through the bottom orifice. The as-spun PET fibers obtained under the above said conditions exhibit birefringence value of 0.20–0.22, tenacity of 7.0–9.0 g/d, elongation at break of 14–30%, initial modulus of 75–90 g/d, and boil-off shrinkage of 5–10%.

Characterization Methods

In the examples which follow, the following characterization methods were employed in determining the reported physical properties.

(a) Birefringence. Fiber birefringence was determined using a 20-order tilting compensator mounted in a Nikon polarizing microscope. An average of five individual determinations was reported for each sample.

(b) Tensile test. Tensile tests were performed on an Instron machine model 1123 on single filaments using a gage length of 25.4 mm and an extension rate of about 100% elongation per minute. Average tenacity, modulus and elongation at break of five individual tests were determined using the method described in test method ASTM D3822-82.

(c) Boil-Off Shrinkage (BOS). Boil-off shrinkage was determined by immersing fiber samples in boiling water for five minutes without tension. Average BOS of about 10 filaments was calculated according to the method described in test method ASTM D2102-79.

(d) X-ray diffraction. Equatorial scans of a bundle of fibers aligned parallel to each other were obtained using a Siemens Type-F X-ray diffractometer system. Crystalline PET fibers show resolved diffraction peaks whereas amorphous samples do not.

(e) Take-up Tension. Take-up force was measured at a point near the take-up device using a Rothschild Tensiometer calibrated at 50 grams full scale.

The present invention is further illustrated by the following examples.

Examples 1–5

A high intrinsic viscosity (IV) industrial grade polyethylene terephthalate polymer (IV of 0.95) was melt extruded at 295° C. through a hyperbolic die with 0.6 mm exit diameter. Polymer throughput was varied with take-up speed to obtain a constant linear density of about 5.0 denier per filament.

Examples 1 and 2 were produced using an apparatus arrangement of the type shown schematically in the drawing. 1,2-propanediol was used as the liquid medium for the liquid isothermal bath, which was maintained at temperatures of 110° C. and 136° C., respectively, for spinning Examples 1 and 2. Example 1 was wound up at a speed of 3000 m/min and Example 2 at 4000 m/min.

Comparative Example 3 was prepared using the same conditions as in 1 and 2 except that room temperature water was used as the liquid medium. Comparative Examples 4 and 5 were produced using the same apparatus except that no liquid bath was employed, i.e., spinning tension was built up by the usual or normal drag of air surrounding the filament surface.

Properties of the above examples are listed in Table II. Examples 1 and 2 satisfy the specifications of the present invention set forth earlier herein. Example 3 shows a relatively high birefringence, which is due to the large drag effect of water; but the fiber is essentially amorphous as evidenced by X-ray diffraction and confirmed by the high value of boil-off shrinkage. Tensile properties of this sample do not fall in the specifications of the present invention described herein. Comparative Example 4, spun in air medium at 3000 m/min, shows typical amorphous X-ray patterns, low level of molecular orientation and poor mechanical performance. Comparative Example 5, produced in air at 6000 m/min, shows a crystalline pattern by X-ray diffraction, but has a low birefringence value. The tensile properties do not meet the specifications of the product of the present invention.

TABLE II

Properties of Filaments Spun from 0.95 IV PET

| Example No. | 1 | 2 | 3 | 4 | 5 |
|---|---|---|---|---|---|
| Spinning with* | LIB | LIB | LIB | air | air |
| Temperature (°C.) | 110 | 136 | 23 | 23 | 23 |
| Speed (m/min) | 3000 | 4000 | 3500 | 3000 | 6000 |
| Within this inv. | yes | yes | no | no | no |
| Birefringence | 0.213 | 0.214 | 0.18 | 0.048 | 0.031 |
| Tenacity | | | | | |
| (g/d) | 8.1 | 8.8 | 4.0 | 3.2 | 4.3 |
| (MPa) | 971 | 1063 | 483 | 372 | 521 |
| Modulus | | | | | |
| (g/d) | 77 | 82 | 55 | 13 | 51 |
| (GPa) | 9.2 | 9.8 | 6.5 | 1.56 | 6.2 |
| Elongation (%) | 18.9 | 17.9 | 32.8 | 205 | 61.6 |
| Boil-off Shrinkage | 10.3 | 8.9 | 47.1 | 26.9 | 2.5 |
| X-ray Diffraction** | X | X | Am | Am | X |

*LIB = Liquid isothermal bath
**X = crystalline; Am = amorphous

EXAMPLES 6–10

In the series of these examples, a lower molecular weight textile grade PET (0.57 IV) was spun into filaments under conditions similar to those used for Examples 1–5. Results are presented in Table III. Examples 6 and 7 were produced using 1,2-propanediol in the liquid isothermal bath at 120° C., a temperature about 45° C. above $T_g$, yielding filaments in accordance with the present invention, characterized by a crystalline structure and high birefringence, high tenacity, and low elongation and boil-off shrinkage. Comparative Example 8 was made using a water bath at 90° C., a temperature below ($T_g$+30) °C., showing an amorphous structure, with thermal instability and mechanical properties inferior to that of the present invention although it is highly oriented due to frictional drawing at the given temperature. Comparative Examples 9 and 10, produced in air without using a liquid bath, show properties not satisfying the specifications of the product of the present invention.

TABLE III

Properties of Filaments Spun from 0.57 IV PET

| Example No. | 6 | 7 | 8 | 9 | 10 |
|---|---|---|---|---|---|
| Spinning with* | LIB | LIB | LIB | air | air |
| Temperature (°C.) | 120 | 120 | 90 | 23 | 23 |
| Speed (m/min) | 3000 | 3500 | 3000 | 3000 | 6000 |
| Within this inv. | yes | yes | no | no | no |
| Birefringence | 0.215 | 0.220 | 0.197 | 0.048 | 0.139 |
| Tenacity | | | | | |
| (g/d) | 7.3 | 8.2 | 5.4 | 3.0 | 4.1 |
| (MPa) | 879 | 9763 | 645 | 354 | 500 |
| Modulus | | | | | |
| (g/d) | 89 | 85 | 71 | 24 | 59 |
| (GPa) | 10.3 | 10.1 | 8.6 | 2.86 | 7.2 |
| Elongation (%) | 21.6 | 14.2 | 34.8 | 150 | 61.6 |
| Boil-off Shrinkage | 8.23 | 6.7 | 27.3 | 45.1 | 2.4 |
| X-ray Diffraction** | X | X | Am | Am | X |

*LIB = Liquid isothermal bath
**X = crystalline; Am = amorphous

Radial Uniformity Measurements

The radial birefringence of the filaments of Example 7 was determined using a Jena interference microscope. The local refractive indices, $n_l$ and $n_\perp$, parallel and perpendicular to the fiber axis, respectively, were calculated using a shell-model for determination of radial birefringence distribution. Chord-average refractive indices and birefringence were also reported. Lorentz optical density, $k_p$, was determined by the following equation:

$$k_p = \frac{n_{iso}^2 - 1}{n_{iso}^2 + 2}$$

where, $$n_{iso} = \frac{2n_l + n_\perp}{3}.$$

The analysis of interference fringes was conducted with a completely automated process.

Figure 2:
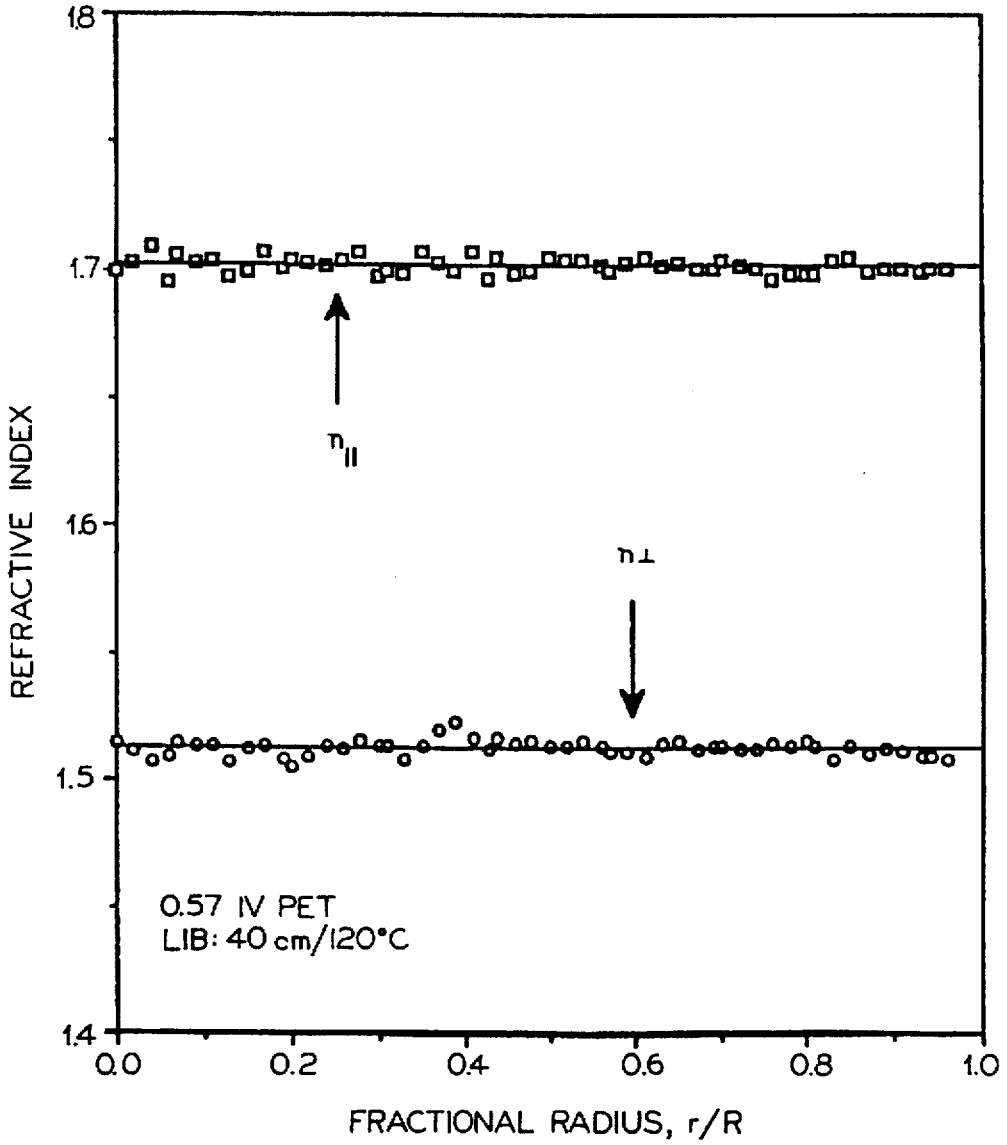
FIGS. 2–6 are graphs illustrating the radial uniformity of refractive index, birefringence, and Lorentz density of filaments produced in accordance with this invention.
Figure 3:
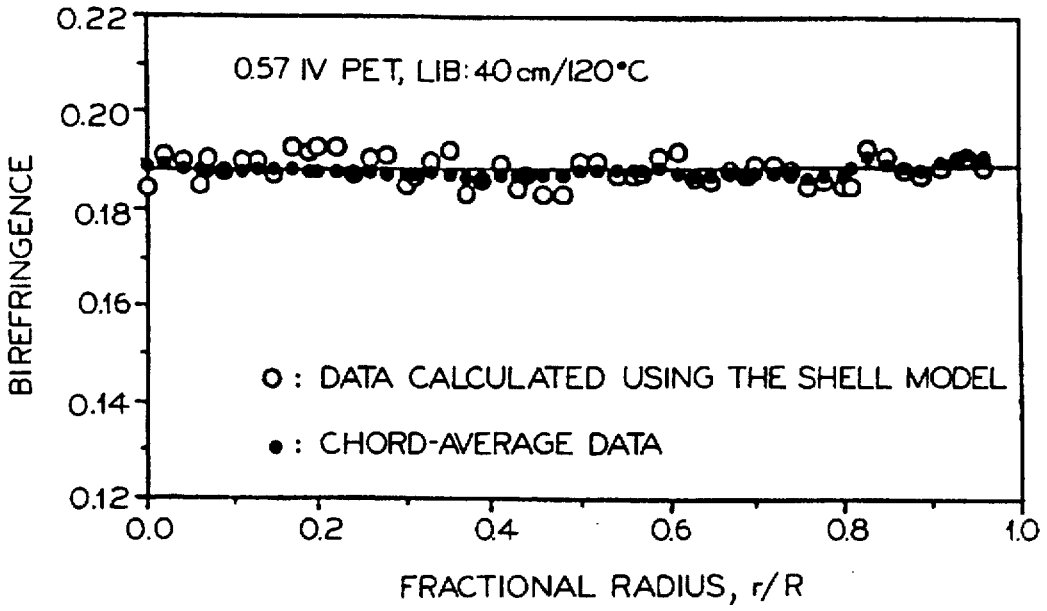
Figure 4:
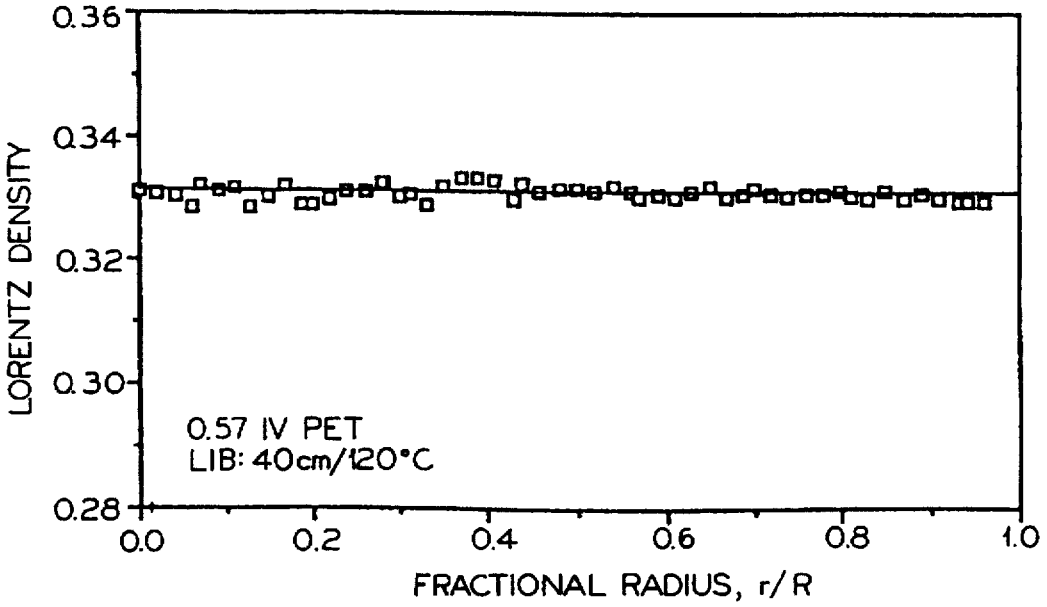

FIG. 2 shows the radial distribution of two refractive indices, $n_l$ and $n_\perp$, parallel and perpendicular, respectively, to the axis of the fiber of Example 7, which was spun from 0.57 IV PET at 3,500 m/min with a liquid isothermal bath at 120° C. The radial distributions of $n_l$ and $n_\perp$ of the fiber are essentially flat. Radial distribution of birefringence is shown in FIG. 3. The filled circles are the chord-average birefringence and the open circles are the "true" local birefringence calculated using the shell-model. FIG. 4 shows the radial distribution of Lorentz (optical) density in the spun filaments. Since the Lorentz density is proportional to the normal density or crystallinity, the flat profile implies that there is a uniform density or crystallinity in the cross section of the filaments.

Figure 5:
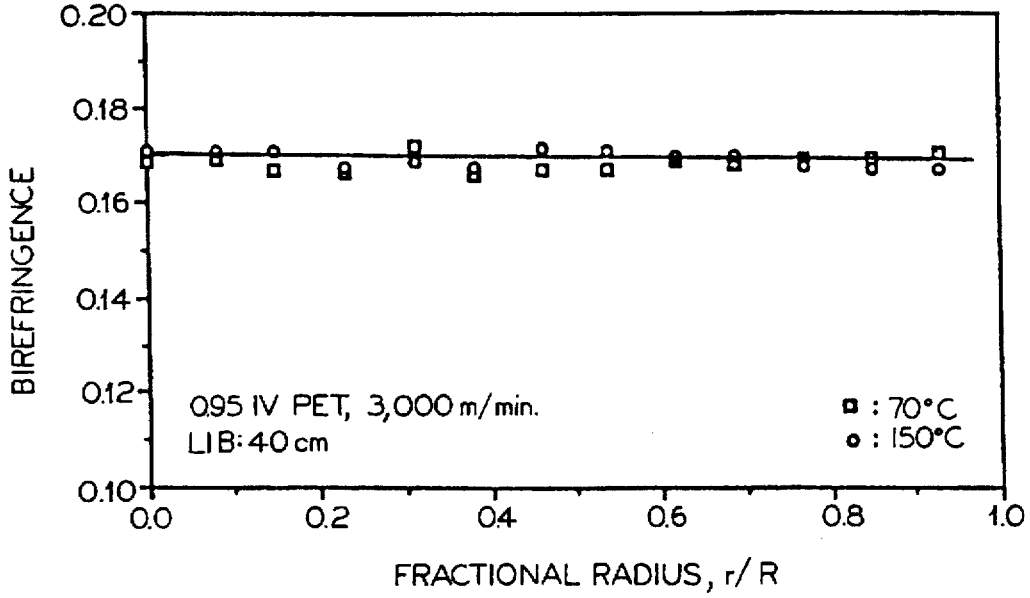
Figure 6:
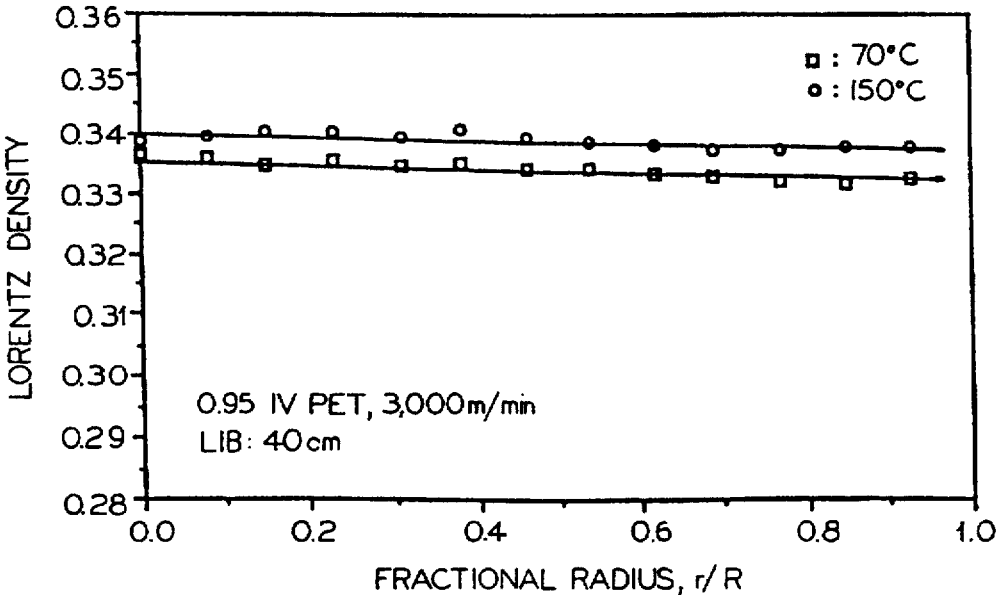

FIG. 5 shows radial birefringence distributions of two fibers spun with the liquid isothermal bath at two different temperatures. The take-up speed used was 3,000 m/min. Radial distributions of the Lorentz optical densities are given in FIG. 6. It is shown that the birefringence and optical density are radially uniform in both samples. Consistent with the normal density measurement, the filaments spun at the higher liquid isothermal bath temperature show higher optical density than that of the sample spun at the lower bath temperature, although the birefringences of the two samples are about the same. These observations again demonstrate that spinning with a liquid isothermal bath can produce filaments with not only a high level of molecular orientation but also a highly uniform radial structure.

These data confirm that an absence of radial temperature gradient in the fiber structure developing zone leads to the elimination of skin-core effect, which is usually encountered in normal high-speed spinning. Although some degree of radial temperature gradient may be present in the upper region of the threadline before the filament enters the liquid isothermal bath, virtually little structure develops in that region because of the low level of spinning stress. After the filament enters the liquid, it can reach the liquid temperature very rapidly and is subject to an isothermal condition in the liquid bath while the fiber structure is being developed. This results in development and formation of a radially uniform fiber structure.

EXAMPLES 11–13

In the following examples, an industrial nylon-6 ($M_n$=20,000) was used instead of PET chips for spinning using the same apparatus under the same conditions unless otherwise noted. Dried nylon chips were melted and extruded at 275° C. Example 11, which is in accordance with the invention, was spun at 3500 m/minute using a liquid isothermal bath with the liquid bath temperature set at 90° C., which is approximately 40 degrees above the nylon glass transition temperature. The comparative examples 12 and 13 were produced with no water bath, but quenched in the air medium and taken-up at 3000 and 4000 m/minute, respectively. The orientation characteristics of these examples are listed in Table IV.

TABLE IV

Spinning of Nylon Fibers

| Example No. | 11 | 12 | 13 |
|---|---|---|---|
| Spinning with | LIB | air | air |
| Temperature (°C.) | 90 | 23 | 23 |
| Speed (m/min) | 3500 | 3000 | 4000 |
| Within this inv. | yes | no | no |
| Birefringence | 0.050 | 0.033 | 0.033 |

Since industrial fully oriented nylon fiber has birefringence in the range of 0.0454–0.060, it is demonstrated that spinning using a liquid bath at elevated temperatures (30°+$T_g$ or above) is capable of producing highly oriented nylon fibers as well. It is shown by the comparative examples 12 and 13 that such highly oriented fibers cannot be produced with the conventional spinning method, i.e., using air medium.

EXAMPLES 14–19

Further Characterization of Filament Properties

In order to further characterize the filaments of the present invention and to define those properties which distinguish the inventive filaments from commercially available melt-spun filaments, various properties relating to the crystal structure, crystalline orientation and molecular orientation were measured and compared. Two commercially available polyethylene terephthalate fiber samples provided by Allied Fibers were used as controls (Examples. 14 and 15) and four experimental samples of polyethylene terephthalate fiber (Examples 16–19) produced in accordance with the process of the present invention as described herein were employed. The molecular orientation and crystal structure and orientation were examined by measuring mean birefringence, radial distribution of birefringence, percent crystallinity, crystal size, crystalline orientation factors, and fourier transform infrared spectroscopy. These properties are summarized in Table V and are discussed more fully below. Other fiber physical properties were also measured and are shown in Table V and discussed below.

A. Radial Distribution of Δn

The measurement of Radial profiles of birefringence is a well documented characterization technique[1]. The presence of a radially differentiated structure is expected to reduce the physical properties of a fiber[2]. Most conventionally produced fibers exhibit a uniform distribution of orientation along the fiber cross-section. In contrast, high-speed spun fibers produced at speeds equivalent to the speeds used in the production of the experimental fibers, typically have a nonuniform distribution of orientation. However, the measurement of radial birefringence profiles showed the distribution of orientation to be uniform among both the commercial (Ex. 14–15) and experimental (Ex. 16–19) fiber samples. Therefore the observed differences in fiber properties are not considered to be due to any type of gross non-uniformity in orientation.

[1]E. J. Roche and H. A. Davis, Fiber Producer, 51–55. February, 1984.

[2]A. Ziabicki, "High-Speed Fiber Spinning", A. Ziabicki and H. Kawai, Eds., Wiley, New York, p. 58, 1985.

B. Mean Birefringence, Δn

The mean birefringence is used as an average measure of the overall degree of molecular orientation along the fiber axis. The measured value may be skewed and correlate poorly with other properties if the distribution of orientation is non-uniform. However, as discussed in the previous section, both the commercial and experimental fiber samples exhibit a uniform distribution of orientation along the fiber cross-section, therefore the mean birefringence should be considered as an accurate assessment of overall orientation. As shown in Table V, the commercial fiber samples (Ex. 14–15) have a birefringence ranging from 0.215 to 0.202. Note, there appears to be a relation in the commercial fiber samples (Ex. 14–15) in which a lower birefringence coincides with lower values of tenacity and modulus. Each of the experimental fiber samples (Ex. 16–19) has a birefringence greater than or equal to 0.216, with correspondingly high tenacities and moduli.

C. Crystallinity (wt %)

The crystallinity of all of the fiber samples was calculated via the measured fiber density. As shown in Table V, both of the commercial fiber samples (Ex. 14–15) have near equivalent crystallinities of 48.6 wt % and 47.5 wt %. While the presence of crystallinity plays an important role in determining fiber properties, the manner in which this crystallinity is developed, as well as, the specific structure associated with it also plays an important role. The experimental fiber samples (Ex. 16–19) have significantly lower crystallinities than either of the commercial fiber samples, however, many of their other physical properties are similar. This key distinction is believed to further substantiate the presence of a significantly different microstructure within the experimental fiber samples compared with the commercial samples.

D. Crystal Size

The average crystallite dimension associated with a given reflection plane can be used to help distinguish differences in crystal structure. The average crystal size for three of the most commonly characterized reflection planes (100, 010, $\bar{1}05$) found in PET have been determined for both the commercial and experimental fiber samples. The dimensions associated with the 100 and 010 reflection planes represent average crystal sizes measured in a direction transverse to the axis of the oriented fiber. The dimension calculated for the $\bar{1}05$ reflection plane represents the average crystal size measured in a direction parallel to the axis of the oriented fiber. As shown in Table V, the crystal sizes for each of the reflection planes are smaller for the experimental fiber samples. More particularly, for the fibers of the present invention, the crystal size is less than 40 Å in the 100 and $\bar{1}05$ planes and less than 30 Å in the 010 plane. This result is consistent with the crystallinity (wt %) values, and confirms the presence of a significantly different micro structure.

E. Orientation Factors

The crystalline orientation factor was determined through direct x-ray scattering measurements on the actual fiber samples. The crystalline orientation factor ($f_c$) represents the average degree of orientation for the crystalline regions with respect to the oriented fiber axis. The amorphous orientation factor ($f_a$), determined through an indirect technique[3], provides similar quantified alignment information for the amorphous regions. For both orientation factors ($f_c$, $f_a$), perfect alignment of the particular region with respect to the oriented fiber axis would correspond to a value of one. The average orientation associated with both the crystalline and amorphous regions plays a critical role in determining the macroscopic fiber properties. As shown in Table V, the commercial fiber samples have a high, relatively constant crystalline orientation factor ($f_c$), but the amorphous orientation factor ($f_a$) decreases significantly from commercial fiber 1 to commercial fiber 2. While the experimental fiber samples have a lower crystalline orientation factor than the commercial fiber samples, their amorphous orientation factors are consistently higher. The dissimilar balance between crystalline and amorphous orientation among the commercial and experimental fiber samples is believed to be one of the most important distinguishing features. The ratio of the crystalline orientation factor to the amorphous orientation factor ($f_c/f_a$) is 1.2 or less, while $f_c$ is 0.9 or above, for fibers of the present invention, whereas this ratio for the commercial fibers is significantly higher. More particularly, it will be seen that in the examples shown (Examples 16–19) the $f_c/f_a$ ratio is within the range of 1.0 to 1.15.

[3]J. H. Dumbleton. J.Polym. Sci., Ser. A-2. 6 795, 1963.

F. Fourier Transform—Infrared Spectroscopy

Fourier transform—Infrared (FT-IR) Spectroscopy can be used to obtain quantitative information on the relative amounts of various molecular arrangements present in a fiber sample[4]. Improved physical properties requires enhanced molecular orientation, which in turn requires the uncoiling or straightening of the constituent molecules. The presence of gauche conformers in a polymer chain is indicative of a molecule which is not straight or is referred to as being coiled. The presence of trans conformers in a polymer chain is indicative of a molecule which is straight, note the presence of a high trans content does not necessarily imply how the molecule is aligned, only that the molecule is relatively straighter. Therefore, a high ratio of trans-to-gauche conformers suggests a fiber structure which is composed of straighter or more "extended" molecular chains. As shown in Table V, the ratio of trans-to-gauche conformers present in the experimental fiber samples is only slightly lower and considered comparable to that observed in the commercial fiber samples. However, when the comparable ratio of trans-to-gauche in the experimental fiber samples, is considered in conjunction with the high level of overall orientation ($\Delta n$) and low level of crystallinity, the conclusion emerges that the amorphous orientation should be higher in the experimental fiber samples, this finding is in good agreement with the previously discussed amorphous orientation factor.

[4]H. M. Heuvel and R. Huisman, J.Appl. Polym. Sci., 30, 3069–3093, 1985.

G. Hot-Air Shrinkage

The Hot-Air shrinkage is calculated as the percentage change in length when the unrestrained fiber is exposed to hot-air at 177° C. Shrinkage values are used as a measure of the dimensional stability of a fiber. Many PET fiber applications subject the fibers to elevated temperatures, the shrinkage behavior of a fiber then becomes very important in determining which particular applications the fiber would best be suited for. As shown in Table V, the commercial fiber samples have shrinkage values ranging from 13.7% to 5.9%. The experimental fiber samples have shrinkage values ranging from 12.1% to 21.0%. Typically, low shrinkage is a desirable feature in most industrial reinforcement applications. The shrinkage or dimensional stability of PET fibers can be reduced to some extent by heat-setting. However, the heat-setting process, and the elevated temperatures which the preformed fibers are subjected to, results in crystallization and relaxation, both of which can significantly alter the balance of other fiber properties such as crystalline and amorphous orientation, modulus, LASE-5 and tenacity. The ideal process would impart the necessary level of dimensional stability during the fiber formation process, thereby eliminating the need for the subsequent heat-setting. Note, the experimental fibers have not been heat-set, yet all but one of the shrinkage values are within the upper portion of the range present among the commercial fibers.

H. Intrinsic Viscosity

The intrinsic viscosity is directly proportional to the polymer-average molecular weight. While not all synthetic fiber properties are strongly affected by the polymer molecular weight, most are influenced enough by the molecular weight that its relative value or range should be presented with the physical properties of the resulting fibers. As shown in Table V, the commercial fiber samples have an intrinsic viscosity greater than or equal to 0.90 dl/g, this information was provided by the fiber manufacturer. The intrinsic viscosity of the experimental fiber samples was measured using the same general technique as that of the commercial fiber manufacturer. The experimental fiber samples all have intrinsic viscosities within the range of 0.80 dl/g to 0.90 dl/g. While the experimental fiber intrinsic viscosity may be slightly less than that of the commercial fiber samples, the difference is not of such magnitude that the previous property comparisons should not be considered valid.

I. Fiber Property Differences

The differences in physical properties between the commercial fibers (Examples 14–15) and the experimental fibers (Examples 16–19) becomes clear when the balance between tenacity, modulus and LASE-5 values is considered. Among the commercial fiber products, it appears that the observed increase in LASE-5, comes at the expense of a decline in both tenacity and modulus. As shown for the experimental fiber products, LASE-5 and modulus values have been increased beyond those of the commercial fiber products, without the drastic reduction in tenacity being incurred. Also, elongation values of the experimental fiber products are slightly lower than those of the commercial fiber products.

Through a comparison of the crystallinity (wt %) and respective crystal sizes, differences in the amount of crystalline material present, as well as, the size of the crystalline regions present becomes obvious. The experimental fibers (Examples 16–19) have achieved equivalent, and in some cases superior, physical properties with a lower level of crystallinity. This characteristic is believed to be one the most discriminating features between the commercial and experimental fiber products.

The balance between crystalline and amorphous orientation serves to further make it clear that significantly different structures exist between the commercial and experimental fiber products. The commercial fiber products have a high crystalline orientation, along with a relatively lower amorphous orientation. In contrast, the experimental fiber products have a low crystalline orientation, along with a relatively higher amorphous orientation. The importance of amorphous orientation in controlling physical properties is well recognized in the field of fiber and polymer science. A comparison of amorphous orientation factors with physical properties, such as modulus and LASE-5 values, provides further information as to how and why the experimental fiber products should be considered unique.

The results from FT-IR Spectroscopy provides additional data to support the observed structural differences between the commercial and experimental fiber products. The ratio of trans-to-gauche conformers present in the experimental fiber products is comparable to that in the commercial fiber products. When this information is combined with overall orientation and crystallinity, an inference suggesting the presence of higher amorphous orientation in the experimental fiber products is justified. Again, this finding is in good agreement with the previously discussed amorphous orientation factor.

The present invention is not limited by the specific examples given above. The embodiments of the invention also apply to fiber spinning of synthetic polymers other than those specifically illustrated above, based on the similar principle of polymer crystallization in the high tension threadline. Nylon-66 and polyolefins are two typical examples, which are apparent to those skilled in the art.

TABLE V

| | Sample Identification | | | | | |
|---|---|---|---|---|---|---|
| Property | Ex. 14 | Ex. 15 | Ex. 16 | Ex. 17 | Ex. 18 | Ex. 19 |
| 1. Breaking Tenacity (gf/d) | 9.5 | 7.4 | 9.4 | 8.8 | 8.9 | 9.2 |
| 2. Initial Modulus (gf/d) | 96.1 | 87.9 | 112.4 | 93.6 | 110.5 | 106.0 |
| 3. LASE-5 (gf/d) | 2.94 | 3.31 | 3.64 | 3.43 | 3.89 | 3.14 |
| 4. Elongation to Break (%) | 16.6 | 16.5 | 10.1 | 11.7 | 10.1 | 16.3 |

TABLE V-continued

| Property | Sample Identification | | | | | |
|---|---|---|---|---|---|---|
| | Ex. 14 | Ex. 15 | Ex. 16 | Ex. 17 | Ex. 18 | Ex. 19 |
| 5. Radial Distribution of Δn | uniform | uniform | uniform | uniform | uniform | uniform |
| 6. Mean Birefringence, Δn | 0.215 | 0.202 | 0.220 | 0.216 | 0.217 | 0.223 |
| 7. Crystallinity (wt %) | 48.6 | 47.5 | 17.0 | 21.2 | 15.2 | 20.8 |
| 8. Crystal Size (Å) 100/010/$\bar{1}05$ | 40/30/48 | 47/35/43 | 18/26/37 | 15/25/31 | 19/26/34 | 21/18/29 |
| 9. Orientation Factors $f_c/f_a$ | 0.97/0.79 | 0.95/0.71 | 0.92/0.82 | 0.91/0.80 | 0.92/0.80 | 0.90/0.84 |
| Ratio of $f_c/f_a$ | 1.23 | 1.34 | 1.12 | 1.14 | 1.15 | 1.07 |
| 10. FT-IR (ratio of trans/gauche) | 2.53 | 2.46 | 2.39 | 2.45 | — | — |
| 11. Hot-Air Shrinkage (%) | 13.7 | 5.9 | 13.9 | 12.1 | 14.2 | 21.0 |
| 12. Intrinsic Viscosity (dl/g) | ≧0.90 | ≧0.90 | 0.8 < IV < 0.9 | 0.8 < IV < 0.9 | 0.8 < IV < 0.9 | 0.8 < IV < 0.9 |

Property Characterization Method References:
1–4 ASTM D3822-82.
5. Jena Interference Microscope interfaced with a computer imaging system.
6. Leitz 20 Order Tilting Compensator and a Nikon Polarizing Microscope.
7. Via Density Measurement (ASTM D1505-68), using $\rho_{am}$ = 1.335 g/cc and $\rho_{cr}$ = 1.455 g/cc.
8. Determined using Wide-Angle X-ray Scattering data in conjunction with the Scherrer equation (P. Scherrer, Gottingher Nachrichten, 2, 93, 1918).
9. Orientation Factors were determined using standard techniques as described in the appropriate literature (V. B. Gupta and S. Kumar, J. Polym. Sci., Polym. Phys. Ed., 17, 179, 1979) and (J. H. Dumbleton, J. Polym. Sci., Ser., A-2, 6. 795, 1968).
10. Unique information regarding relative amounts of the gauche and trans conformers present (T. Kunugi, A. Suzuki and M. Hashimoto, J. Appl. Polym. Sci., 26, 1958. 1981).
11. Free Shrinkage @177° C., using ASTM D885-78 procedure as a general guide.
12. Allied Chemical Corp., Fiber Division, Method No. P-501.2, Oct 29, 1974., approximate range of the commercial fiber IVs was provided by the manufacturer.

That which is claimed is:

1. [Thermoplastic] *As spun thermoplastic* polymer filaments having a ratio of the crystalline orientation factor ($f_c$) to the amorphous orientation factor ($f_a$) is 1.2 or less, while $f_c$ is 0.9 or above and a crystal size of less than 40 Å in the 100 and $\bar{1}05$ planes and less than 30 Å in the 010 plane.

2. [Thermoplastic] *As spun thermoplastic* polymer filaments as set forth in claim 1 exhibiting radial uniformity of birefringence.

3. [Thermoplastic] *As spun thermoplastic* polymer filaments as set forth in claim 1 possessing an as-spun birefringence of 0.20–0.22.

4. [Filaments] *As spun thermoplastic polymer filaments* according to claim 1 formed of industrial grade polyethylene terephthalate polymer and having a tenacity of 8–9 g/d, a birefringence of 0.20–0.22 and a crystalline X-ray diffraction pattern.

5. [Filaments] *As spun thermoplastic polymer filaments* according to claim 1 formed of textile grade polyethylene terephthalate polymer and having a tenacity of 7–9 g/d, a birefringence of 0.20–0.22 and a crystalline X-ray diffraction pattern.

6. [Thermoplastic] *As spun thermoplastic* polymer filaments according to claim 1 formed of polyethylene terephthalate polymer and having a tenacity of 7–9 g/d, a birefringence of 0.20–0.22, and exhibiting a crystalline X-ray diffraction pattern.

7. [Thermoplastic] *As spun thermoplastic* polymer filaments according to claim 1 formed of nylon polymer and having a birefringence of 0.045–0.060 and exhibiting a crystalline X-ray diffraction pattern.

8. [Thermoplastic] *As spun thermoplastic* polymer filaments as set forth in claim 1 wherein said ratio is within the range of 1.0 to 1.15.

9. [Thermoplastic] *As spun thermoplastic* polymer filaments as set forth in claim 1 having a weight percent crystallinity of less than 40.

10. [Thermoplastic] *As spun thermoplastic* polymer filaments as set forth in claim 1 having a weight percent crystallinity of less than 25.

11. [Thermoplastic] *As spun thermoplastic* polymer filaments having a weight percent crystallinity of less than 40 and a crystal size of less than 40 Å in the 100 and $\bar{1}05$ planes and less than 30 Å in the 010 plane.

12. [Thermoplastic] *As spun thermoplastic* polymer filaments as set forth in claim 11 in which the weight percent crystallinity is less than 25.

13. [Thermoplastic] *As spun thermoplastic* polymer filaments according to claim 11 formed of polyethylene terephthalate polymer and having a tenacity of 7–9 g/d, a birefringence of 0.20–0.22, and exhibiting a crystalline X-ray diffraction pattern.

14. [Thermoplastic] *As spun thermoplastic* polymer filaments according to claim 11 formed of nylon polymer and having a birefringence of 0.045–0.060 and exhibiting a crystalline X-ray diffraction pattern.

15. [Thermoplastic] *As spun thermoplastic* polymer filaments as set forth in claim 11 exhibiting radial uniformity of birefringence.

16. [Thermoplastic] *As spun thermoplastic* polymer filaments as set forth in claim 11 possessing an as-spun birefringence of 0.20–0.22.

17. [Filaments] *As spun thermoplastic polymer filaments* according to claim 11 formed of industrial grade polyethylene terephthalate polymer and having a tenacity of 8–9 g/d, a birefringence of 0.20–0.22 and a crystalline X-ray diffraction pattern.

18. [Filaments] *As spun thermoplastic polymer filaments* according to claim 11 formed of textile grade polyethylene terephthalate polymer and having a tenacity of 7–9 g/d, a birefringence of 0.20–0.22 and a crystalline X-ray diffraction pattern.

*19. As-spun polyethylene terephthalate polymer filaments having a birefringence of about 0.2 or greater and exhibiting a crystalline X-ray diffraction pattern.*

*20. As-spun polyethylene terephthalate polymer filaments according to claim 19 exhibiting radial uniformity of birefringence.*

*21. As-spun polyethylene terephthalate polymer filaments according to claim 19 having a tenacity of 7–9 g/d.*

*22. As-spun polyethylene terephthalate polymer filaments according to claim 19 having a weight percent crystallinity of less than 40.*

*23. As-spun polyethylene terephthalate polymer filaments according to claim 22 having a weight percent crystallinity of less than 25.*

*24. As-spun polyethylene terephthalate polymer filaments according to claim 19 having a crystal size of less than 40 Å in the 100 and $\bar{1}05$ planes and less than 30 Å in the 010 plane.*

*25. As-spun polyethylene terephthalate polymer filaments according to claim 19 wherein said birefringence is 0.2–0.22.*

* * * * *